United States Patent [19]

Rantanen et al.

[11] Patent Number: 4,871,059
[45] Date of Patent: Oct. 3, 1989

[54] MEANS FOR FORMING WOOD PORTIONS FROM A WOOD FLOW

[75] Inventors: Raimo Rantanen, Lahti; Pentti Huhta, Salpakangas; Hans-Erik Winqvist, Hyvinkää, all of Finland

[73] Assignee: Kone Oy, Helsinki, Finland

[21] Appl. No.: 101,695

[22] Filed: Sep. 28, 1987

Related U.S. Application Data

[63] Continuation-in-part of Ser. No. 867,673, May 28, 1986, abandoned.

[30] Foreign Application Priority Data

Jun. 13, 1985 [FI] Finland .................................. 852352

[51] Int. Cl.⁴ .............................................. B65G 47/04
[52] U.S. Cl. ..................................... 198/532; 198/359;
414/790.8; 414/788.2
[58] Field of Search ...................... 198/532, 463.6, 359,
198/360; 221/251; 414/126, 50, 30, 745, 748,
745.7, 790.8, 907, 788.2; 209/517, 521

[56] References Cited

U.S. PATENT DOCUMENTS 3,545,630 12/1970 Ivanto ...................................... 414/77
3,815,763 6/1974 Biloco et al. ....................... 198/463.6
3,873,000 3/1975 Eaton et al. ..................... 414/126 X
4,540,107 9/1985 Davidson ......................... 414/126 X
4,624,616 11/1986 Freese .............................. 221/251 X

FOREIGN PATENT DOCUMENTS 379718 8/1923 Fed. Rep. of Germany .
45243 4/1972 Finland .

Primary Examiner—Robert J. Spar
Assistant Examiner—Cheryl L. Gastineau
Attorney, Agent, or Firm—Sughrue, Mion, Zinn, Macpeak and Seas

[57] ABSTRACT

Apparatus for dividing a supply of pieces of wood into portions has an aperture for receiving the wood pieces, pivotable grippers for retaining the wood pieces from falling through the aperture, a support which is movable downwardly relative to the aperture to allow a plurality of the wood pieces to descend therewith, the plurality of wood pieces constituting one of the portions, and hydraulic pistons and cylinders for operating the grippers after the downward movement of the support, to retain subsequent wood pieces from falling through the aperture, whereby the remainder of the wood pieces can be temporarily retained from descending with the support.

4 Claims, 3 Drawing Sheets

MEANS FOR FORMING WOOD PORTIONS FROM A WOOD FLOW

CROSS REFERENCE TO RELATED APPLICATION

This application is a continuation-in-part of our application Ser. No. 867,673, filed May 28, 1986, now abandoned.

BACKGROUND OF THE INVENTION

1. Field of the Invention

The present invention relates to apparatus for dividing a supply of logs, a wood pile, e.g. on a belt, chain or other conveyor and into an aperture in the conveyor, adjacent to a grinding machine.

2. Background of the Invention

At the present time, apparatuses by which so-called continuous action grinding machines are fed, and apparatuses by which batch-type grinding machines are fed are already known.

In a feeding apparatus for grinding machines of the batch type, supervision is needed, and an operator controls the operations, for instance with the aid of press buttons. As the quality of wood becomes poorer and the log diameters decrease, there is a great risk that the wood batches will be poor in quality, which causes disturbances.

BRIEF SUMMARY OF THE INVENTION

It is accordingly an object of the present invention to provide an apparatus by which the forming of wood portions, for instance for a grinding machine, is accomplished with more assurance than before and without any disturbances in operation.

According to the invention, there is provided apparatus for dividing a supply of pieces of wood into portions, comprising means defining an aperture for receiving the wood pieces, first means, for retaining the wood pieces from falling through the aperture, second means movable downwardly relative to the aperture to allow a plurality of the wood pieces to descend therewith, the plurality of wood pieces constituting one of the portions, and means for operating the first means after the downward movement of the second means, to retain the wood pieces from falling through the aperture, whereby the remainder of the wood pieces can be temporarily retained from descending with the second means.

Preferably, the first means comprise gripper members and means pivotably supporting the gripper members for pivotal movement between a first position, in which the gripper members allow the wood pieces to fall through the aperture, and a second position in which the gripper members are operated to retain the wood pieces from falling.

An important advantage of the invention is that wood portions can be formed from a continuous wood flow.

BRIEF DESCRIPTION OF THE DRAWINGS

Further features, objects and advantages of this invention will become apparent from the following description of the invention with reference to the accompanying drawing, in which.

DESCRIPTION OF THE PREFERRED EMBODIMENT

Figure 1:
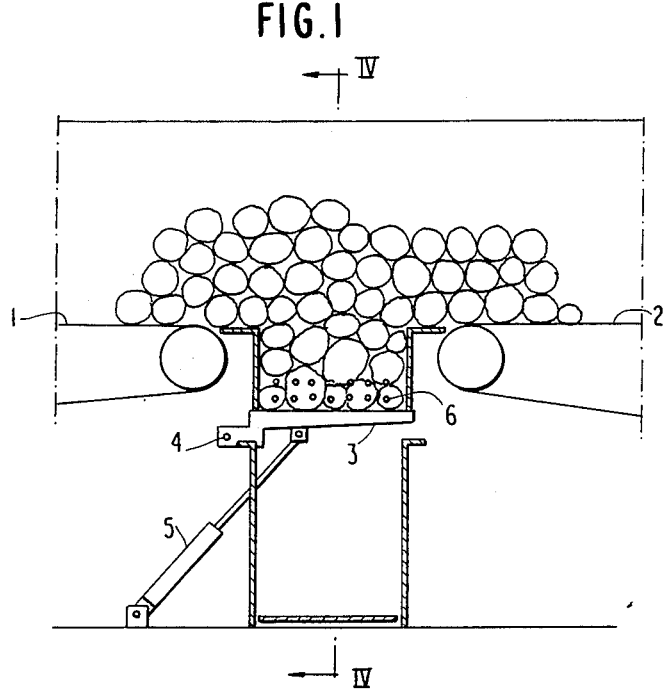
FIG. 1 shows schematically in elevational view apparatus according to the invention for forming wood portions, a dropping or support means being shown in a first or upper position.
Figure 2:
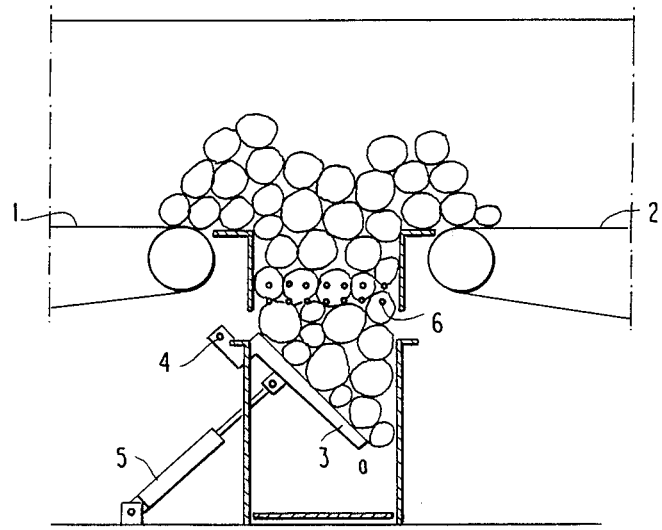
FIG. 2 shows the same as FIG. 1, but with the support means in an intermediate position.
Figure 3:
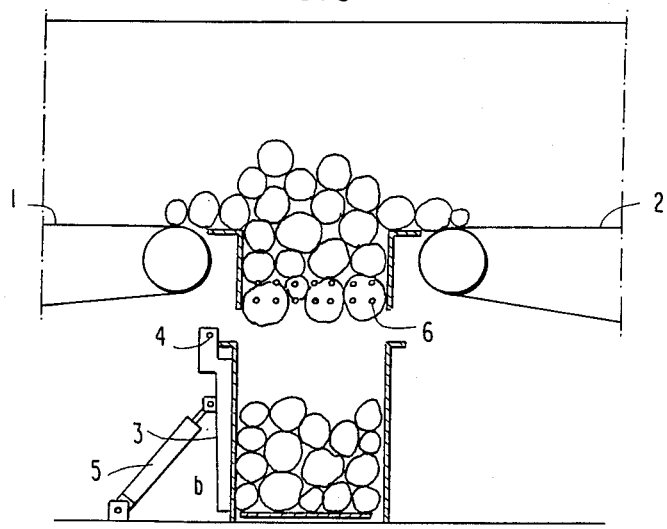
FIG. 3 shows the same as FIGS. 1 and 2, but with the support means in its second or lower position.

In FIGS. 1 to 3, apparatus embodying the invention is depicted in various phases of its operation. Wood blocks or logs arrive along one or both of a pair of conveyors 1, 2 at an aperture formed between the conveyors. An apparatus such as thus far described has been disclosed in Finnish Pat. No. 45243, the disclosure of which is incorporated herein by reference. In other words, the conveyors are used in turn in both directions, though for a longer time in the direction in which one desires to transport the wood. Arching of the wood at the aperture or shaft between the conveyors 1, 2 is thus prevented. The conveyors themselves may be of any type, for instance chain, belt or other equivalent conveyors.

The aperture between the conveyors is provided in the vicinity of a grinding machine or at a location where the portions are formed, and it is understood that the aperture is kept filled with blocks in the manner disclosed in Finnish Pat. No. 45243. At the beginning of the operating cycle, dropping or support means 3 in the form of a support grid (see FIG. 4) provided at the aperture closes the aperture as shown in FIG. 1. The support means 3 is pivotally mounted so as to be turnable about a pivot 4 between a first position, in which it is shown in FIG. 1 and in which it extends across the path of movement of the logs falling through the aperture and retains the logs, and a second position in which it is shown in FIG. 3 and in which it is displaced from this path of movement. Gripper members 6, provided above the dropping means at opposite sides of the aperture, are not yet in operation at this phase.

Figure 4:
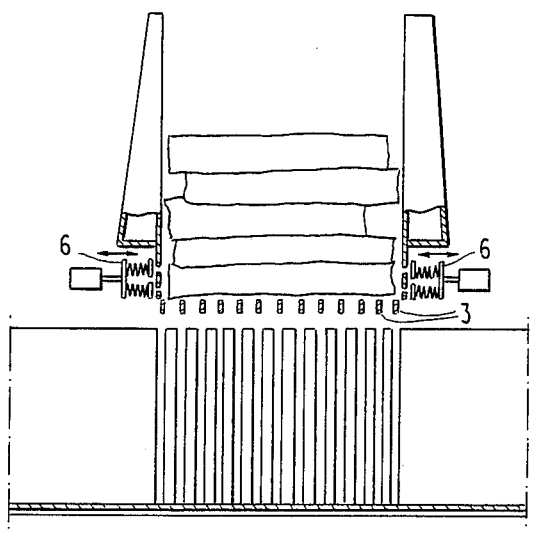
FIG. 4 shows a section through the apparatus along the line IV—IV of FIG. 1.

Thereafter, the dropping means 3 is slowly pivoted, with the aid of a hydraulic cylinder 5 attached thereto, into the position shown in FIG. 2. The blocks or logs may now descend from the situation in which they are shown in FIG. 1. The gripper members 6 are at this phase urged into contact with the overlying logs as shown in FIG. 4, whereby the overlying wood pile is locked in place and the size of the portion of-logs deposited below the gripper means is determined.

Thereafter, the dropping means 3 is pivoted further to its extreme second position, shown in FIG. 3, whereby the blocks or logs below the gripper members 6 form one portion, which can descend to a desired destination, such as a grinding machine or a conveyor means. The wood batch is moved forward, and the dropping means 3 closes again into the position shown in FIG. 1, and a new work cycle may start.

Referring now to the embodiment of the invention depicted in FIGS. 5 to 8, wood blocks or logs arrive along one or both of a pair of conveyors 11, 12 at an aperture formed between the conveyors. In other words, as in the embodiment of FIGS. 1 to 4, the conveyors are used in turn in both directions, though for a longer time in the direction in which one desires to transport the wood. Arching of the wood at the aperture or shaft between the conveyors 11, 12 is thus prevented. The conveyors themselves may again be of any type, for instance chain, belt or other equivalent conveyors.

Figure 7:
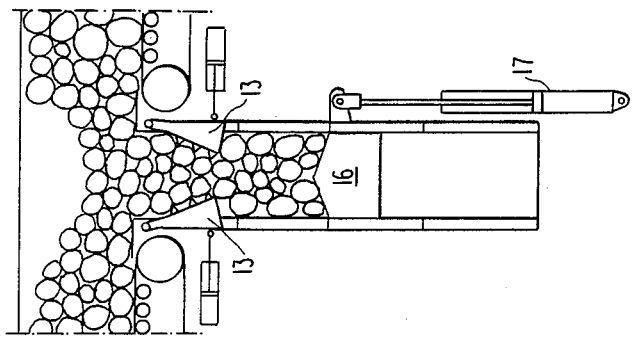
FIG. 7 shows the same as FIGS. 2 and 6 but with the gripper means closed.
Figure 5:
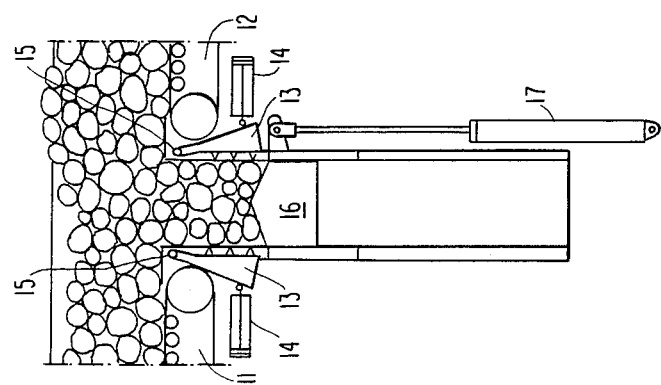
FIG. 5 shows schematically in elevational view a modified apparatus according to the invention for forming wood portions, a dropping or support means being shown in a first or upper position and gripper means being open.

The aperture between the conveyors is provided in the vicinity of a grinding machine or at a location where the portions are formed, and it is understood that the aperture is kept filled with blocks in the manner disclosed in Finnish Pat. No. 45243. At the beginning of the operating cycle, dropping or support means 16 is in an upper position and gripper means 13 are open, as shown in FIG. 5. The gripper means 13 are pivotally mounted so as to be pivotable by hydraulic piston and cylinder devices 14 about respective pivots 15 between a first position, in which they are shown in FIG. 5 and in which they allow logs to fall through the aperture, and a second position in which they are shown in FIG. 7 and in which they retain the logs from falling. Gripper means 13 are provided above the dropping or support means 16 at opposite sides of the aperture and are not yet in operation at the phase shown in FIG. 5.

Figure 6:
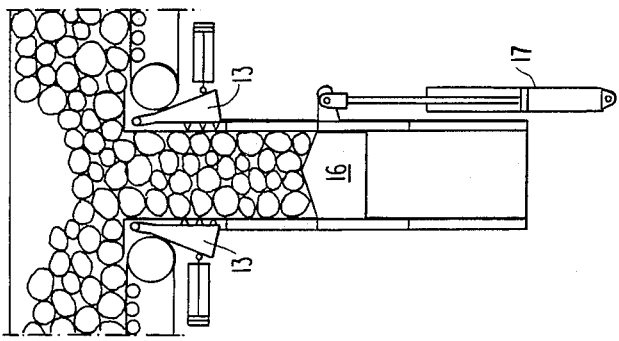
FIG. 6 shows the same as FIG. 5, but with the support means in an intermediate position.

Thereafter, the dropping or support means 16 descend slowly, with the aid of a hydraulic cylinder 17 attached thereto, into the position shown in FIG. 6. The blocks or logs may now descend from the situation in which they are shown in FIG. 5. The gripper means 13 are at this phase urged into contact with the overlying logs as shown in FIG. 7, whereby the overlying wood pile is locked in place and the size of the portion of logs deposited below the gripper means is determined.

Figure 8:
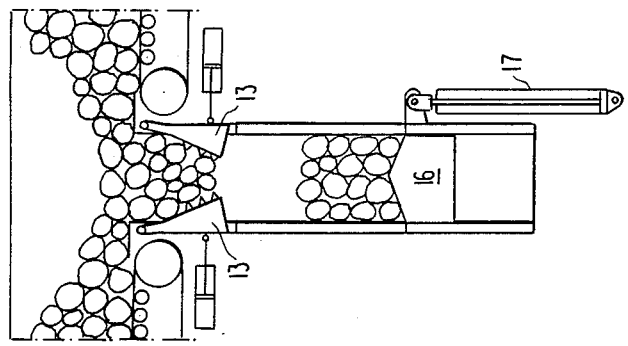
FIG. 8 shows the same as FIG. 7 but with the support means in its lower position.

Thereafter, the dropping or support means 16 descends further to its extreme second position, shown in FIG. 8, whereby the blocks or logs below the gripper members 13 form one portion, which can descend to a desired destination, such as a grinding machine or a conveyor means. The wood batch is moved forward, and the dropping or support means 16 rises again into the position shown in FIG. 5, and a new work cycle may start.

It will be obvious to a person skilled in the art that the invention is not confined to the embodiments presented by way of example in the foregoing, and that it may be varied within the spirit and scope of the claims appended hereto.

We claim:

1. Apparatus for dividing a supply of elongate wood logs into a plurality of portions, comprising:
    means (1,2; 11,12) defining an aperture for receiving the wood logs;
    first means (6; 13) comprising a pair of facing gripper members disposed on opposite sides of the aperture and movable between an inwardly directed clamping position for restraining said wood logs from falling through said aperture and an open position permitting downward passage of wood logs under gravity;
    second, support means (3; 16) disposed immediately below the first means and movable vertically upwardly and downwardly relative to said aperture to directly receive a plurality of said wood logs constituting one of said portions released by the first means and to allow said one portion to descend therewith at a controlled rate; and
    means for operating said first means from said open position to said clamping position after a downward movement of said support means, so as to restrain further wood logs from falling through said aperture and onto said support means, such that a remainder of said wood logs is temporarily restrained from descending with said one portion and said support means.

2. Apparatus as claimed in claim 1, comprising means (15) for pivotably supporting said gripper members for pivotal movement between said open position and said clamping position.

3. Apparatus as claimed in claim 2, wherein said operating means comprise hydraulic piston and cylinder means (14) for pivoting said gripper members between said open and clamping positions, and wherein said support means comprises a support member (16), and hydraulic piston and cylinder means (17) for driving said support member upwardly and downwardly.

4. Apparatus as claimed in claim 1, wherein said gripper members are horizontally displaceable towards each other to clamp opposite ends of said wood logs therebetween and away from each other to release said wood logs.

* * * * *